United States Patent
Stecewycz

(10) Patent No.: US 10,453,055 B2
(45) Date of Patent: Oct. 22, 2019

(54) METHOD FOR SECURE ELECTRONIC TENDER

(71) Applicant: Joseph Stecewycz, Groton, MA (US)

(72) Inventor: Joseph Stecewycz, Groton, MA (US)

(73) Assignee: Cytherean Mandelbrot LLC, Groton, MA (US)

( * ) Notice: Subject to any disclaimer, the term of this patent is extended or adjusted under 35 U.S.C. 154(b) by 0 days.

(21) Appl. No.: 13/765,683

(22) Filed: Feb. 12, 2013

(65) Prior Publication Data

US 2014/0058858 A1    Feb. 27, 2014

Related U.S. Application Data

(60) Provisional application No. 61/597,825, filed on Feb. 12, 2012.

(51) Int. Cl.

| | |
|---|---|
| *G06Q 20/38* | (2012.01) |
| *G06K 19/07* | (2006.01) |
| *G06Q 20/20* | (2012.01) |
| *G06Q 20/06* | (2012.01) |
| *G06Q 20/28* | (2012.01) |
| *G06Q 20/34* | (2012.01) |
| *G06Q 20/40* | (2012.01) |
| *G07F 7/08* | (2006.01) |

(52) U.S. Cl.
CPC ....... *G06Q 20/382* (2013.01); *G06K 19/0725* (2013.01); *G06Q 20/0655* (2013.01); *G06Q 20/20* (2013.01); *G06Q 20/204* (2013.01); *G06Q 20/28* (2013.01); *G06Q 20/352* (2013.01); *G06Q 20/3572* (2013.01); *G06Q 20/405* (2013.01); *G06Q 20/409* (2013.01); *G07F 7/0806* (2013.01)

(58) Field of Classification Search
None
See application file for complete search history.

(56) References Cited

U.S. PATENT DOCUMENTS

| | | | |
|---|---|---|---|
| 4,567,473 A | 1/1986 | Lichtblau | |
| 5,510,770 A | 4/1996 | Rhoads | |
| 6,424,315 B1 | 7/2002 | Glenn | |
| 7,474,211 B2 | 1/2009 | Kramer | |
| 7,774,228 B2 | 8/2010 | Robinson | |
| 8,805,736 B2 * | 8/2014 | Melik-Aslanian | G06Q 20/24 705/38 |
| 2001/0001856 A1 * | 5/2001 | Gould | G06Q 20/10 705/39 |
| 2002/0174336 A1 * | 11/2002 | Sakakibara | G07C 9/00087 713/172 |
| 2003/0167207 A1 * | 9/2003 | Berardi | G06Q 10/025 705/16 |

(Continued)

*Primary Examiner* — Allen C Chein
(74) *Attorney, Agent, or Firm* — Joseph Stecewycz

(57) ABSTRACT

The invention is a method of conducting a secure monetary transaction with a funded secure tender electronic card by: (i) pre-selecting a monetary amount as a card usage parameter for the secure tender electronic card, the monetary amount having a value of from zero cents to ninety nine cents, (ii) storing the card usage parameter in an electronic card server, and (iii) validating, via the electronic card server, a pending monetary transaction using the electronic card only when the transaction cents amount is equal to the stored card usage parameter.

15 Claims, 6 Drawing Sheets

(56) References Cited

U.S. PATENT DOCUMENTS

| | | | |
|---|---|---|---|
| 2004/0113791 A1* | 6/2004 | Salim | G06K 17/0022 340/572.3 |
| 2004/0210498 A1* | 10/2004 | Freund | G06Q 20/10 705/30 |
| 2005/0044245 A1* | 2/2005 | Hoshina | G06Q 20/346 709/229 |
| 2008/0046331 A1* | 2/2008 | Rand | G06Q 30/00 705/26.81 |
| 2008/0140575 A1* | 6/2008 | Cannady | G06Q 20/24 705/67 |
| 2008/0179386 A1* | 7/2008 | Oberan | B42D 1/005 235/375 |
| 2009/0198529 A1* | 8/2009 | Burkholder | G06Q 10/087 705/28 |
| 2009/0228391 A1* | 9/2009 | Sorbe | G06Q 40/02 705/38 |
| 2010/0191605 A1* | 7/2010 | Nuttall | G06Q 20/10 705/17 |
| 2010/0288834 A1 | 11/2010 | Tichelaer | |
| 2011/0184868 A1* | 7/2011 | Lacerte | G06Q 20/04 705/45 |

* cited by examiner

METHOD FOR SECURE ELECTRONIC TENDER

CROSS REFERENCE TO RELATED APPLICATION

The present application is related to Provisional patent application entitled "System and method for secure electronic tender," filed 12 Feb. 2012 and assigned filing No. 61/597,825, incorporated herein by reference in its entirety.

FIELD OF THE INVENTION

This invention relates generally to electronic monetary transactions and, more specifically, to a system and method for securely using electronic tender in monetary transactions.

BACKGROUND OF THE INVENTION

Most debit and credit cards are associated with some sort of a bank account, or an institution that can extend credit. If an unscrupulous individual appropriates another person's card, he may obtain access to the account by fraudulently using the card, and can access the funds of the cardholder. Even worse, online activity by such unscrupulous individuals often results in a great deal of fraud and identity theft.

In addition, a user may wish to have a means of executing a one-time payment, or a series of similar payments, to a vendor of his choice, without resorting to paying by cash, by credit card, or by debit card. That is, the user might wish to have the convenience of paying for a service or commodity via a transaction similar to using a pre-paid card, but wishes to have this convenience at a commercial establishment which does not offer or accept pre-paid cards. This may occur, for example, when making a payment at a toll booth, or when purchasing a meal at an independent restaurant, or when making a charitable donation, or when patronizing a street vendor in a tourist venue, or when wishing to make a secure transaction while on travel.

More generally, the user may wish to have a method of transacting a purchase or a payment by using an electronic card that allows only certain types of transactions, where the allowable types of transactions are known only to the valid user of the card. What is needed for such situations is a more secure method of making purchases and conducting monetary transactions that mitigates the probability of monetary loss or third-party fraud.

BRIEF SUMMARY OF THE INVENTION

In one aspect of the present invention, a secure tender electronic card having monetary value suitable for use in purchasing a service or a commodity comprises: a plastic substrate; at least two radio frequency identifications (RFIDs) embedded within the plastic substrate, the at least two RFIDs including: a card code RFID with an identification chip, the identification chip having embedded therein an electronic card identification code associated with a card account file resident in a remote server, the card account file including a beneficiary code and a card usage parameter; and a tender RFID with a tender chip having embedded therein a code associated with at least some of the monetary value of the electronic card.

In another aspect of the present invention, a secure tender electronic card system comprises: a secure tender electronic card server having a card account file, the card account file associated with an electronic card identification code, the card account file having stored therein a usage parameter; a secure tender electronic card having a first radio frequency identification (RFID) with an identification chip and a second RFID with a tender chip, the identification chip having stored therein the electronic card identification code, the tender chip associated with a monetary value assigned to the secure tender electronic card; an RFID card reader operative to read the electronic card identification code; and a point-of-sale electronic terminal in communication with the RFID card reader and with the secure tender electronic card server, the point-of-sale electronic terminal operative to retrieve the electronic card identification code from the RFID card reader and transmit the electronic card identification code to the secure tender electronic card server, the point-of-sale electronic terminal further operative to retrieve the usage parameter from the secure tender electronic card server.

In still another aspect of the present invention, a method for conducting a secure monetary transaction comprises the steps of: presenting a secure tender electronic card as payment for at least one of a service or a commodity; reading a radio frequency identification chip in the secure tender electronic card so as to retrieve a card usage parameter associated with the secure tender electronic card, the identification chip having embedded therein an electronic card identification code associated with a card account file resident in a remote server; if the card usage parameter is met under the monetary transaction, executing the secure monetary transaction so as to provide at least one of the service or the commodity to a user of the secure tender electronic card; and, if the card usage parameter is not met under the monetary transaction, cancelling the secure monetary transaction.

The additional features and advantage of the disclosed invention is set forth in the detailed description which follows, and will be apparent to those skilled in the art from the description or recognized by practicing the invention as described, together with the claims and appended drawings.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

The present invention relates to a secure method of making a purchase or payment, by using a pre-paid electronic card rather than a debit or credit card. The user of the electronic card can specify in advance of purchasing the electronic card one or more usage parameters for the electronic card.

Figure 1:
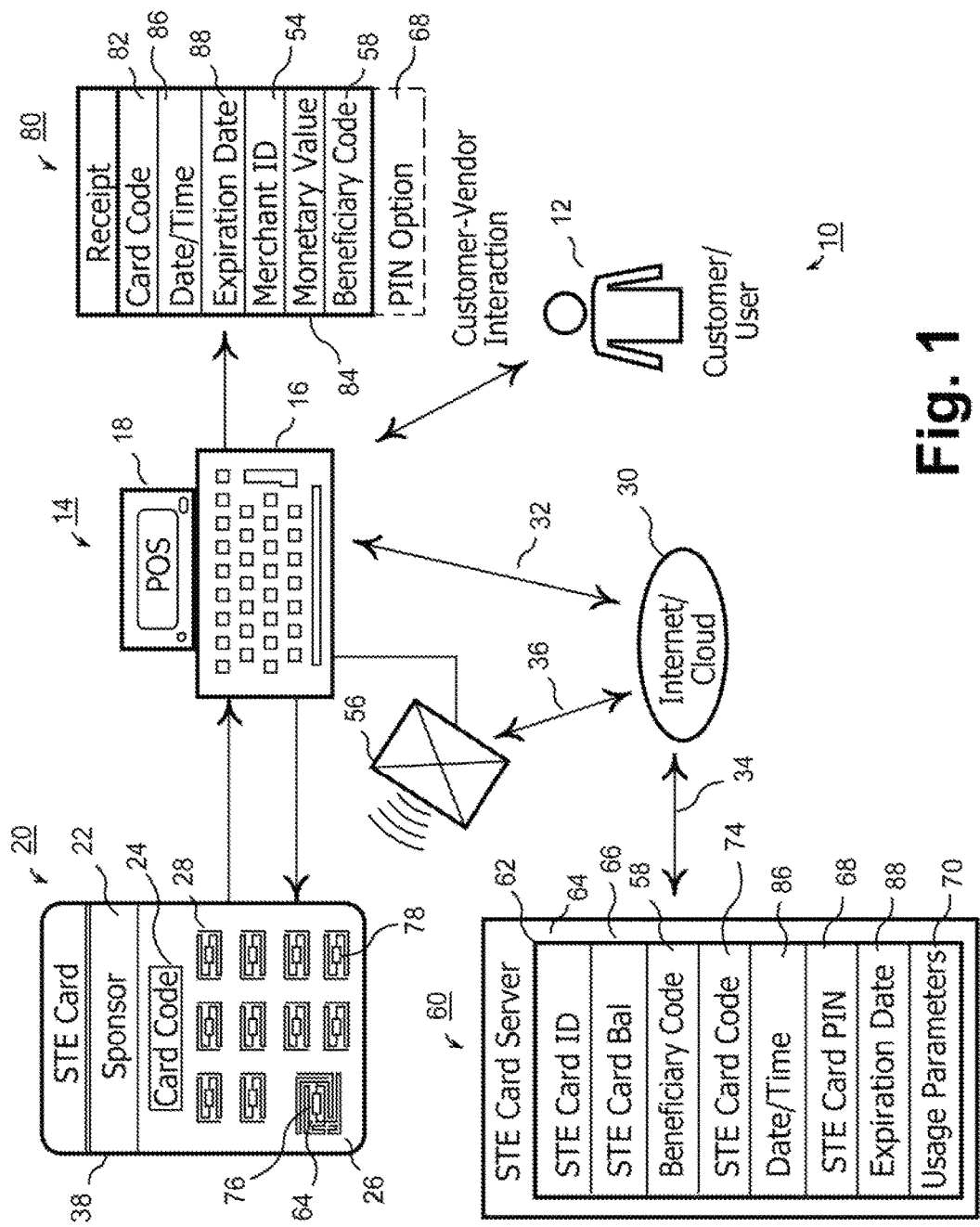
FIG. 1 is a diagrammatical illustration of a secure tender electronic card suitable for use in a secure tender electronic card system, in accordance with an aspect of the present invention.

There is shown in FIG. 1 a functional diagrammatical illustration of a secure tender electronic card (STEC) system 10, in accordance with the present invention. A customer/user 12 may access the STEC system 10 by purchasing from a vendor or merchant a secure tender electronic card 20 at a retail transaction station, conventionally referred to as a point of sale (POS) electronic terminal 14, such as may be found in various types of commercial establishments worldwide.

The size, physical appearance, and material construction of the secure tender electronic card 20 may be similar to that of a conventional credit card or debit card. An electronic card substrate 38 may comprise a plastic polymer material, such as polyvinyl chloride. The POS electronic terminal 14 may include a data entry component 16, such as a physical or virtual keyboard, or a voice-recognition input device (not shown), in communication with a display device 18, such as an LED display, an LCD display, or a plasma panel, as is well-known in the retail marketing field.

Alternatively, the POS electronic terminal 14 may comprise a touch-sensitive screen (not shown) so as to combine both the functions of the data entry component 16 and the display device 18 into a single unit, as is known in the relevant art. The POS electronic terminal 14 may be in wired or wireless communication with a LAN, a WAN, a VPN, or other communication network, such as the Internet/Cloud 30, so as to enable the POS electronic terminal 14 to perform various commercial transactions remotely from a central server, as described below. A POS communication link 32 may be provided between the POS electronic terminal 14 and the Internet/Cloud 30. The POS communication link 32 may comprise a wired connection (e.g., an Ethernet network), a wireless link (e.g., a Bluetooth link or a Wi-Fi access capability), or a combination of a wired and wireless link, as is well-known in the relevant art.

Figure 2:
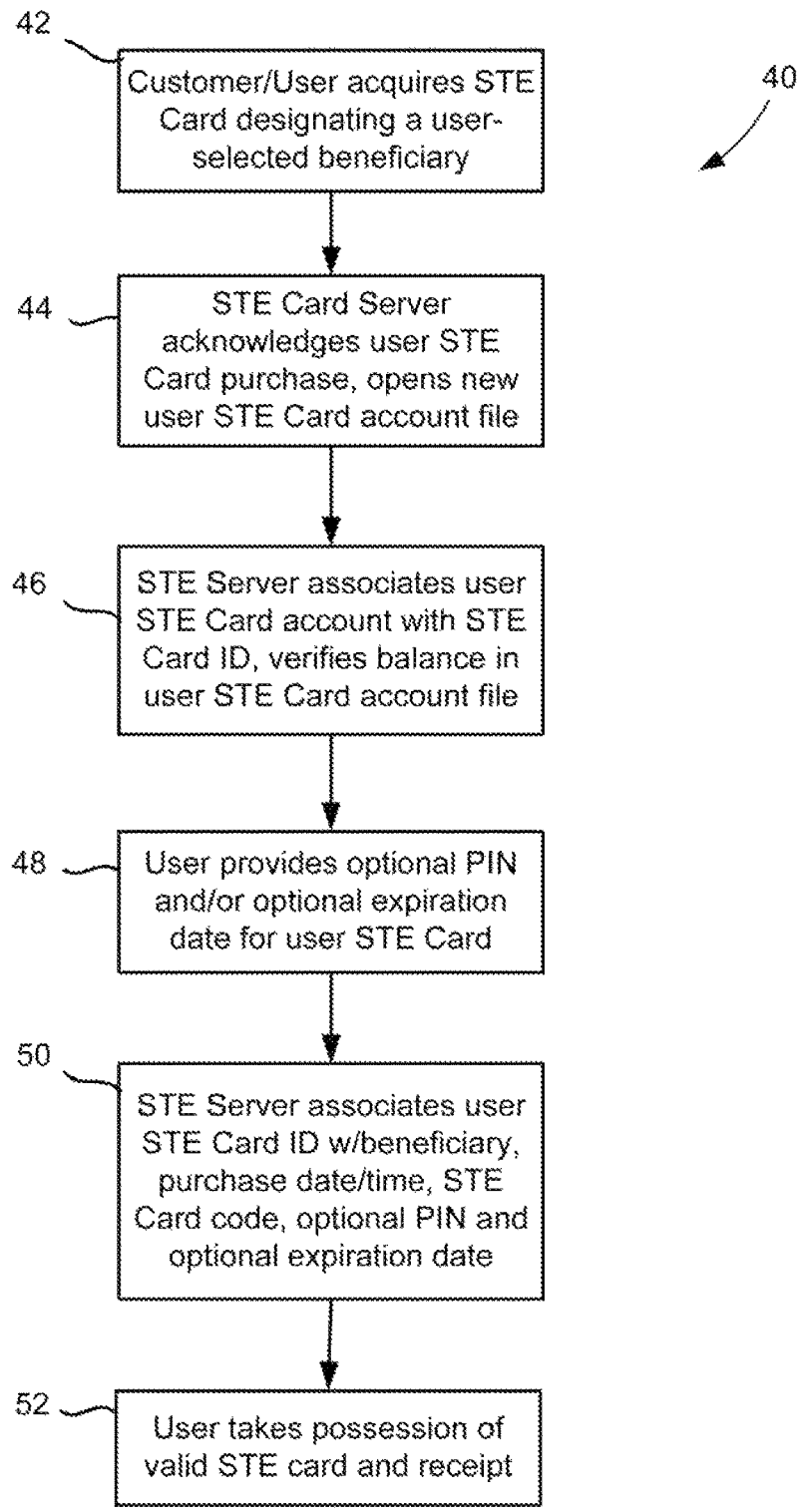
FIG. 2 is a flow diagram explaining customer/user acquisition of the secure tender electronic card of FIG. 1.

Actions initiated by the customer 12 in accessing the STEC system 10, and the subsequent actions executed by the merchant or vendor accessing the POS electronic terminal 14, may be explained with additional reference to a flow diagram 40, shown in FIG. 2. The customer 12 may offer to purchase the secure tender electronic card 20 from the merchant at the POS electronic terminal 14, at step 42. Alternatively, at step 42, the customer 12 may receive the secure tender electronic card 20 at no cost from the merchant, as a reward or monetary benefit provided in response to an earlier customer commercial transaction, contest, or promotion, for example.

The customer 12 may select a secure tender electronic card 20 having a pre-printed sponsor designator 22 thereon, where the selected sponsor may be a charitable organization, a brand name, a professional sports team, a geographical region, an institution of higher learning, a patriotic organization, or another such entity either having name recognition or desiring to acquire name recognition.

The sponsor may have underwritten a portion of the manufacturing costs of the secure tender electronic card 20 in exchange for any sponsor advertising to be realized as the customer 12, or another user, presents the secure tender electronic card 20 to make a purchase, or to gain admission to a desired venue, for example. Accordingly, the merchant operating the POS electronic terminal 14 may have, displayed for purchase, an assortment of secure tender electronic cards 20 identified with various organizations, for convenient selection by the customer 12.

When payment for the secure tender electronic card 20 is made at the POS electronic terminal 14, or if the customer 12 otherwise acquires the secure tender electronic card 20 from the merchant, the POS electronic terminal 14 may be used to communicate with a STEC server 60, via a server communication link 34 that may be part of a LAN, a WAN, a VPN, or other communication network, such as the Internet/Cloud 30.

Once this communication has been established, the POS electronic terminal 14 may transmit to the electronic tender card server 60 data related to the pending transaction, as described in greater detail below. As can be appreciated, the server communication link 34 may comprise a wired connection, a wireless link, or a combination of wired and wireless links. The STEC server 60 may respond to the communication from the POS electronic terminal 14 by opening a new user STEC account file 62, at step 44.

The POS electronic terminal 14 may further be in communication with a radio frequency identification (RFID) card reader 56 that is configured to read a unique card RFID 26 embedded within the secure tender electronic card 20. The unique card RFID 26 includes an ID chip 76 containing a unique STE card ID 64 for the secure tender electronic card 20. The RFID card reader 56 may establish communications with the unique card RFID 26, and the corresponding card ID 64 may then be obtained from the ID chip 76 and transmitted to the STE card server 60 for use in associating the newly-opened STEC account file 62 with the correct secure tender electronic card 20, at step 46.

Preferably, the customer 12 is also asked to provide an optional STE card personal identification character code or identification number (PIN) 68 for entry into the STE card account file 62, at step 48. This may be done by allowing the customer 12 to privately enter the PIN 68 into the POS electronic terminal 14, or into a peripheral device (not shown) in communication with the POS electronic terminal 14. The customer 12 preferably enters the PIN 68 without allowing anyone else to view the characters entered to create the STE card PIN 68.

The STE card PIN 68 may be required at a later time, for example, to mitigate or prevent fraudulent use when the secure tender electronic card 20 is presented in an attempt to make a monetary transaction that exceeds a previously specified amount, or that is being applied to a non-authorized purchase, for example. In an exemplary embodiment, the customer 12 may also specify an expiration date/time 88 for the secure tender electronic card 20, at step 48. Accordingly, once the expiration date/time 88 has been reached, the secure tender electronic card 20 will be automatically invalidated by the STE card server 60, and any funds remaining in the STE card account file 62 will be transferred to a stated beneficiary, such as a charity or humanitarian organization, previously selected by the customer 12.

The RFID card reader 56 may also be used to search for the presence of one or more valid tender RFIDs 28 embedded in the secure tender electronic card 20. The tender RFIDs 28 each include a tender chip 78 having encoded therein a pre-established code providing a monetary value for the individual tender RFID 28. In an exemplary embodiment, one or more of the tender RFIDs 28 may have a monetary value of zero. As can be appreciated by one skilled in the art, the unique card RFID 26 and the tender RFIDs 28 may be in electronic communication with one another to provide for optimal communication with the RFID card reader 56.

In addition, one or more of the tender RFIDs 28 may comprise a passive component, whereby the passive tender RFID 28 is not responsive to a query from the RFID card reader 56. This configuration of an embedded array of valid tender RFIDs 28, zero-value tender RFIDs 28, and passive tender RFIDs 28 on the same secure tender electronic card 20 serves to thwart a potential fraudulent user from being able to optically or electronically inspect the secure tender electronic card 20 and infer whether or not the secure tender electronic card 20 has a value proportional to the number of tender RFIDs detected therein.

The sum of all the tender values in the valid, non-zero tender RFIDs 28 in the secure tender electronic card 20 may be specified as an initial, pre-paid monetary value 84 of the secure tender electronic card 20. This monetary value 84 may also be transmitted to the STE card server 60 for placement into the corresponding account file 62 as an initial STE card balance 66, at step 46. It can be appreciated that the purchase price of the secure tender electronic card 20 substantially reflects the monetary value 84 as read by the RFID reader 56.

The code associated with each individual tender RFID 28 further includes information related to one or more pre-established deposit accounts from which the specific tender RFID 28 may draw funds for the payment or monetary transaction requested. Accordingly, the corresponding pre-established deposit accounts associated with a particular secure tender electronic card 20 may comprise: (i) one single account for all the tender RFIDs 28 on the secure tender electronic card 20; (ii) a system of distributed deposit accounts associating multiple deposit accounts for each of the tender RFIDs 28 on the secure tender electronic card 20; (iii) a system of distributed deposit accounts associating multiple tender RFIDs 28 on the secure tender electronic card 20 with a single deposit account; or, (iv) a system of distributed deposit accounts associating multiple deposit accounts for some of the tender RFIDs 28, and a single account for the remaining tender RFIDs 28 on the secure tender electronic card 20.

It can be appreciated that a single secure tender electronic card 20 may thus be associated with many dozens or hundreds of deposit accounts in a financial system. This configuration of a distributed system of accounting and financial authorization serves to limit fraudulent use of the funds deposited for access when the legitimate user purchased the secure tender electronic card 20.

In an exemplary embodiment, an STE card balance 66 may be provided in the STE card account file 62 identified by the STE card ID 64 assigned to the secure tender electronic card 20. The initial STE card balance 66 may comprise a monetary value equal to the initial monetary value 84 credited to the secure tender electronic card 20 when purchased by the customer 12. Subsequently, when the secure tender electronic card 20 is presented for payment, an RFID card reader, such as may be found in a retail establishment or at a toll booth, may ascertains the current monetary value 84 by: (i) determining the STE card ID 64 from the ID chip 76; (ii) accessing the STE card server 60; (iii) locating the STE card account file 62 using the STE card ID 64; and (iv) reading the current STE card balance 66 information.

Accordingly, when the secure tender electronic card 20 is initially purchased, the monetary value 84 on a purchase receipt 80 may thus be verified against the card balance 66 in the STE card account file 62. If a discrepancy is found between the monetary value 84 and the STE card balance 66, the customer 12 may be offered a substitute secure tender electronic card for purchase. In an exemplary embodiment, the ID chip 76 information may also include the pre-specified expiration date/time 88 for the secure tender electronic card 20. If this expiration date has been pre-determined for the unique card RFID 26, the customer 12 will not be asked to provide an expiration date. Alternatively, the customer 12 may be given the option of removing the pre-specified expiration date/time 88 from the secure tender electronic card 20, such that the pre-specified expiration date/time 88 can be determined only by a valid merchant of vendor accessing the accessing the STE card server 60, as described above for ascertaining the STE card balance 66

After the customer 12 has purchased the secure tender electronic card 20, and the STE card balance 66 has been verified, the operator of the POS electronic terminal 14 may give the purchase receipt 80 to the customer 12 for safekeeping. The purchase receipt 80 may further include one or more of: (i) a printout of the card code 82, (ii) a beneficiary code 58 identifying the beneficiary selected by the user, (iii) a unique identifier 54 for the specific merchant who sold the secure tender electronic card 20 to the customer 12, (iv) the monetary value 84 initially assigned to the secure tender electronic card 20, (v) a date/time stamp 86 of the card purchase transaction, (vi) the expiration date/time 88 for the secure tender electronic card 20, and may include (vii) a personal identification 68 selected by the user. As noted above, the expiration date/time 88 may be a date and/or time selected by the customer 12, or may be a pre-specified expiration date encoded within the ID chip 76.

The customer 12 or other authorized user of the secure tender electronic card 20 may be charged with the task of keeping the information provided in the purchase receipt 80 in a safe place, as explained in greater detail below. For security purposes, a card code label 24, comprising an alphanumeric code, is temporarily attached to the secure tender electronic card 20, as the card code label 24 is not intended to remain with the secure tender electronic card 20 itself. Accordingly, the card code label 24 may be provided only on the packaging for the secure tender electronic card 20, or may alternatively be provided on a temporary sticker affixed to the secure tender electronic card 20 intended for subsequent removal by the customer 12.

The beneficiary code 58, a date/time of STE card purchase 86, a printout 82 of the code on the card code label 24 (stored as an STE card code entry 74), the customer-selected PIN 68, and the expiration date 88 may be sent to the STE card server 60 and stored in the STE card account file 62, at step 50. It can be appreciated that, for security purposes, once the user physically removes the card code label 24 from the secure tender electronic card 20, the correlation between the STE card ID 64 and the card code printout 82 resides only in the STE card server 60. The customer 12 may then take possession of the secure tender electronic card 20 and the purchase receipt 80, at step 52.

After the secure tender electronic card 20 has been purchased, the customer 12 may access the STE card server 60 via the RFID card reader 56, or other communication device (not shown) to select one or more usage parameters to be associated with the secure tender electronic card 20, as explained in greater detail below. The selected usage parameters are stored as a usage parameters file 70 in the STE card server 60, as is known in the relevant art.

Figure 3:
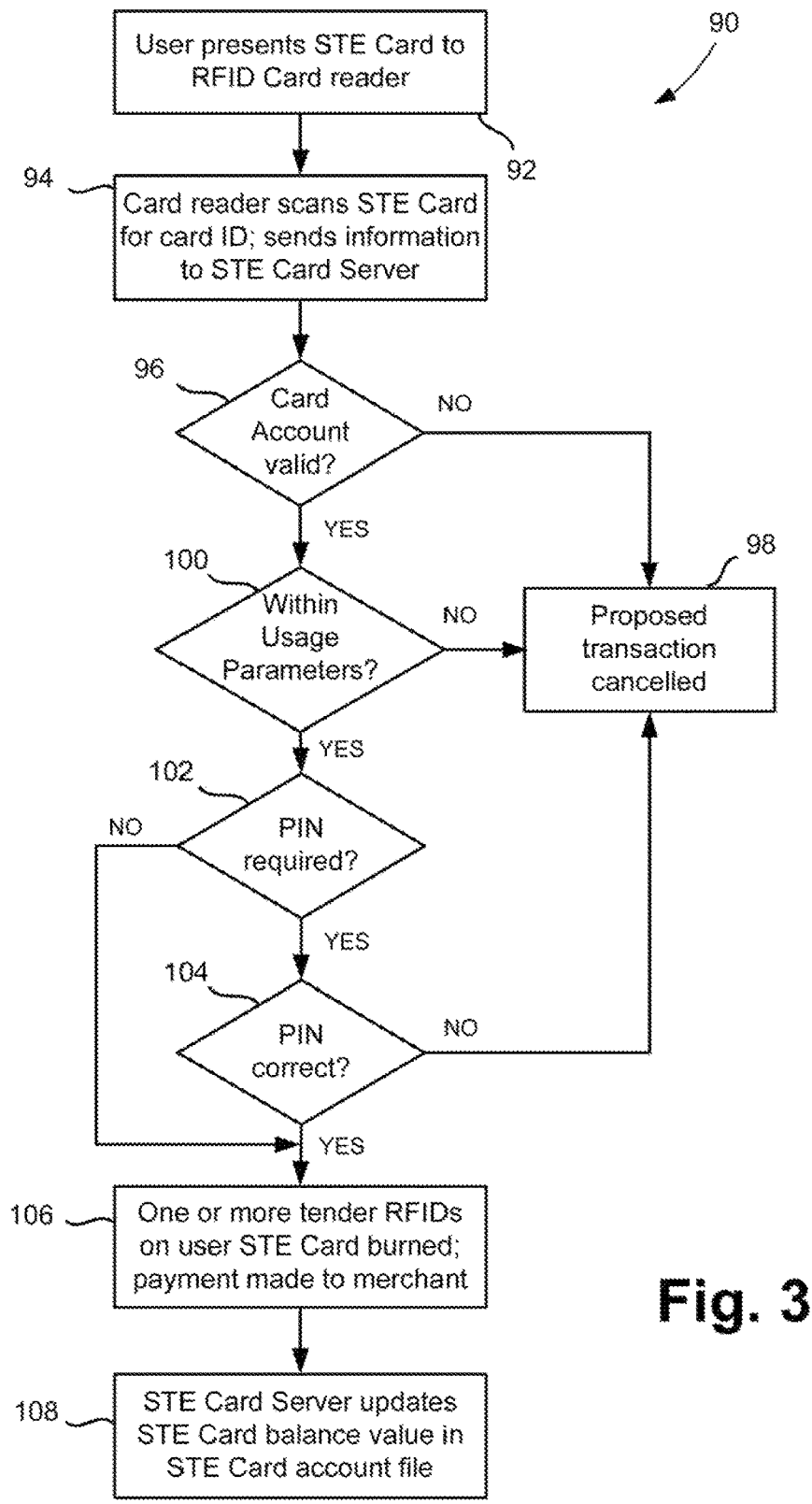
FIG. 3 is a flow diagram explaining customer/user use of the secure tender electronic card of FIG. 1.

To use the secure tender electronic card 20 for making a purchase from a retail facility, for example, the user may follow a procedure illustrated in a flow diagram 90, in FIG. 3. The user presents the secure tender electronic card 20 to the RFID card reader 56 provided by the retail facility, at step 92. The RFID card reader 56 may read the unique card RFID 26, using emission 116 set to a 'read' mode, and receiving a response emission 114 from the secure tender electronic card 20.

Figure 4:
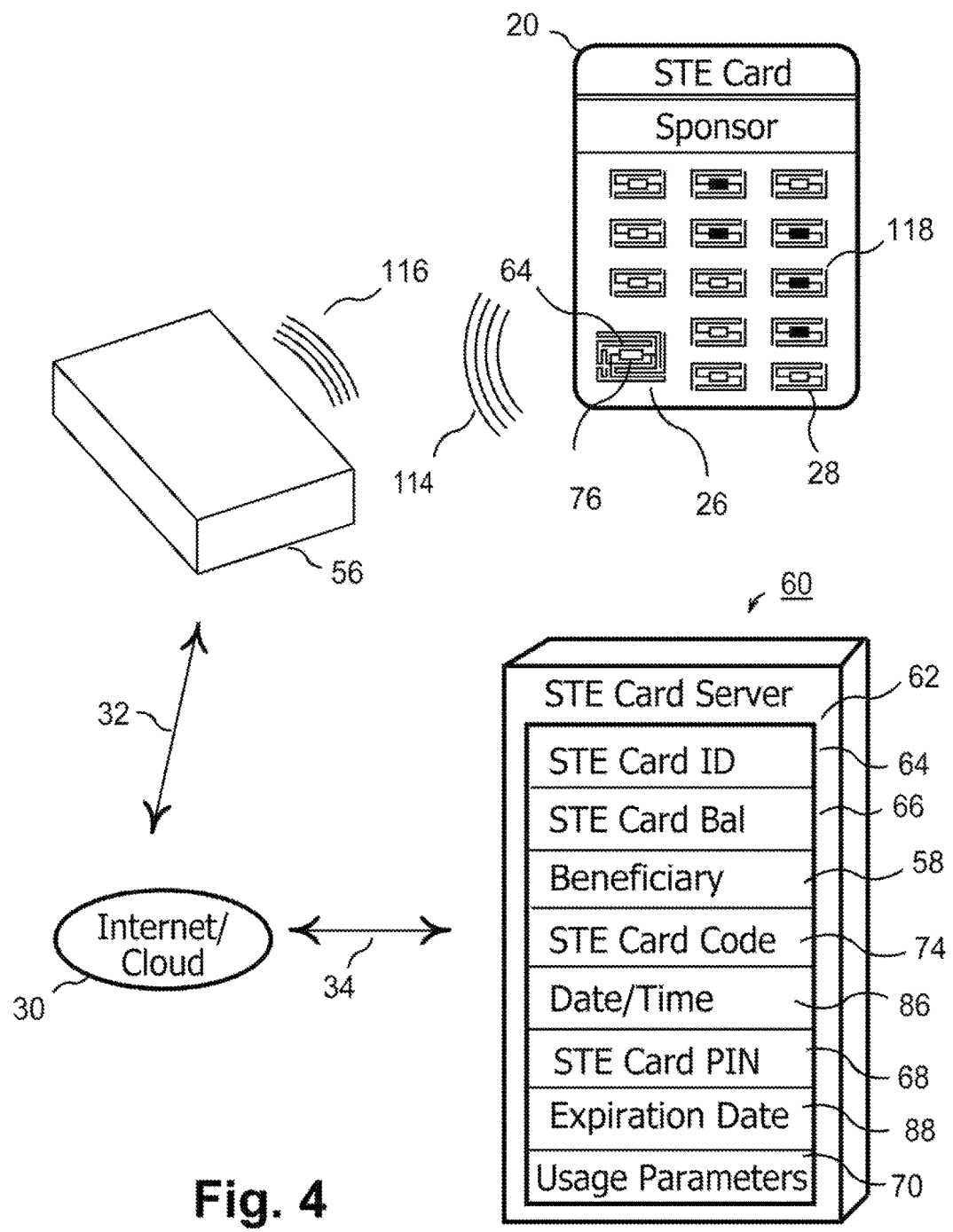
FIG. 4 shows an RFID card reader reading the unique card ID of the secure tender electronic card of FIG. 1.

The received information may be transmitted to the STE card server 60 via the POS communication link 32, the Internet/Cloud 30, and the server communication link 34, as shown in FIG. 4. If, at decision block 96, the secure tender electronic card 20 is determined to be invalid because the card ID 64 cannot be read or verified, or the expiration date 88 has passed, the proposed transaction may be canceled, at step 98. It should be noted that, for security reasons, the user should have previously removed the card code label 24 from the secure tender electronic card 20.

Otherwise, at decision block 96, the secure tender electronic card 20 is presumed to be valid, and an inquiry is made by the STE card server 60 as to whether the proposed monetary transaction, or anticipated purchase, falls within one or more usage parameters previously set for the secure tender electronic card 20, at decision block 100. If the one or more usage parameters are not met by the conditions of the pending monetary transaction, in accordance with the usage parameters file 70, the proposed transaction is canceled, at step 98.

If the proposed monetary transaction falls within or meets the usage parameters, the user may be prompted by the RFID card reader 56 to provide the PIN 68, at decision block 102. This PIN request is optional and may be made for a proposed purchase which exceeds a certain pre-specified amount so as to avoid fraudulent use of the secure tender electronic card 20. If the request for the PIN 68 is made, at decision block 104, and the user cannot provide the proper PIN 68, the proposed transaction may be canceled, at step 98. Otherwise, the process proceeds to step 106. However, for an application in which the secure tender electronic card 20 is to be used for a one-time purchase, such as providing admission to a musical performance, a cinematic presentation, or a sporting event, the user may not be asked to provide the PIN 68 and the process proceeds to step 106.

In an exemplary embodiment, the RFID card reader 56 may respond to the correct PIN 68 (if required) by emitting radiation 116 having a specified frequency and/or intensity sufficient to sequentially 'burn' one or more of the tender chips 78 in the tender RFIDs 28 on the secure tender electronic card 20. This process of 'burning' inactivates one or more of the tender chips 78, and produces one or more corresponding invalid RFIDs 118 on the secure tender electronic card 20. In the example of FIG. 4, the secure tender electronic card 20 has been used for a purchase and shows that eight of the thirteen original tender RFIDs 28 shown are valid tender RFIDs 28, and five tender RFIDs 28 are invalid RFIDs 118. The secure tender electronic card 20 shown has thus consummated a purchase that required an electronic monetary payment represented by one or more of the five tender RFIDs 28.

After the required number of tender RFIDs 28 have been burned or invalidated on the secure tender electronic card 20, the STE card account file 62 in the STE card server 60 may be updated, at step 108, by changing the card balance 66 value to reflect the purchase made by the user at step 106. The user may be able to verify the monetary value 84 of the secure tender electronic card 20 by selecting a 'read' function on the RFID card reader 56 and presenting the secure tender electronic card 20. By thus placing the RFID card reader 56 into a "'balance mode," the RFID card reader 56 may display the remaining balance for any secure tender electronic card 20 presented for balance inquiry.

It can be appreciated that the secure tender electronic card 20 may be carried into a commercial retail area in which one or more RFID card readers 56 are present, but under circumstances in which the user is not planning to make a purchase. For such situations, a metal sleeve (not shown) may be provided to cover all, or a selected portion of, the secure tender electronic card 20 so as to provide protection from stray radiation 116 emitted by a nearby RFID card reader. The sleeve may serve to prevent one or more of the tender RFIDs 28 from being inadvertently invalidated, as is known in the relevant art. The sleeve may be positioned on the secure tender electronic card 20 by the user to 'expose' only the number of tender RFIDs 28 that may be required to complete a pending purchase. This sleeve positioning may be made to prevent the RFID card reader 56 from burning or invalidating more than the necessary number of tender RFIDs 28 required for the proposed purchase.

In an exemplary embodiment, the STE card account file 62 may include criteria, or limitations, stored in the usage parameters file 70, on the proposed monetary transactions the user (either valid or fraudulent) of the secure tender electronic card 20 may attempt to make. Preferably, these usage parameters are known only to the valid holder of the secure tender electronic card 20. In this way, fraudulent use may be mitigated or prevented as the fraudulent user attempts to initiate a monetary transaction which violates a time/date criterion associated with the secure tender electronic card 20, or which exceeds another limitation placed on the secure tender electronic card 20 by the user at the time of card purchase.

Pre-determined criteria placed on the secure tender electronic card 20 (via the card code 24) may include one or more usage parameters such as, for example: (i) a requirement that an allowable valid monetary transaction may be made only between specified hours, for example, only between 6:00 PM and 11:00 PM; (ii) a requirement that a valid monetary transaction may be made only for purchase of food, or for a meal at a specified dining establishment or a franchise establishment; (iii) a requirement that a valid monetary transaction may not be made for alcoholic beverages; (iv) a requirement that a valid monetary transaction may not be made on pre-specified days of the week, for example, only Saturday and Sunday; or, (v) a requirement that a valid monetary transaction may be made only for a monetary amount ending in a pre-specified set of values, for example, while a purchase for $5.50 or $29.50 may be allowed, a purchase for any other amount not ending in fifty cents would not be authorized by the STE card server 60.

Examples of card limitations, or usage parameters, that may be placed on the use of the secure tender electronic card 20 and encoded in the usage parameters file 70 include: (i) valid monetary transactions include transactions for an amount less than a pre-specified value, for example, a purchase below $25.00 would be allowed, but purchases for a larger amount would not be authorized by the STE card server 60; (ii) after an initial purchase is made for an allowable amount, for example $50.00, a subsequent purchase for any amount exceeding the initial purchase amount would not be authorized by the STE card server 60; or, (iii) valid monetary transactions include transactions only for an amount greater than a first pre-specified value and less than a second pre-specified value, for example, only purchases between $25.00 and $50.00 would be allowed by the STE card server 60.

Figure 5:
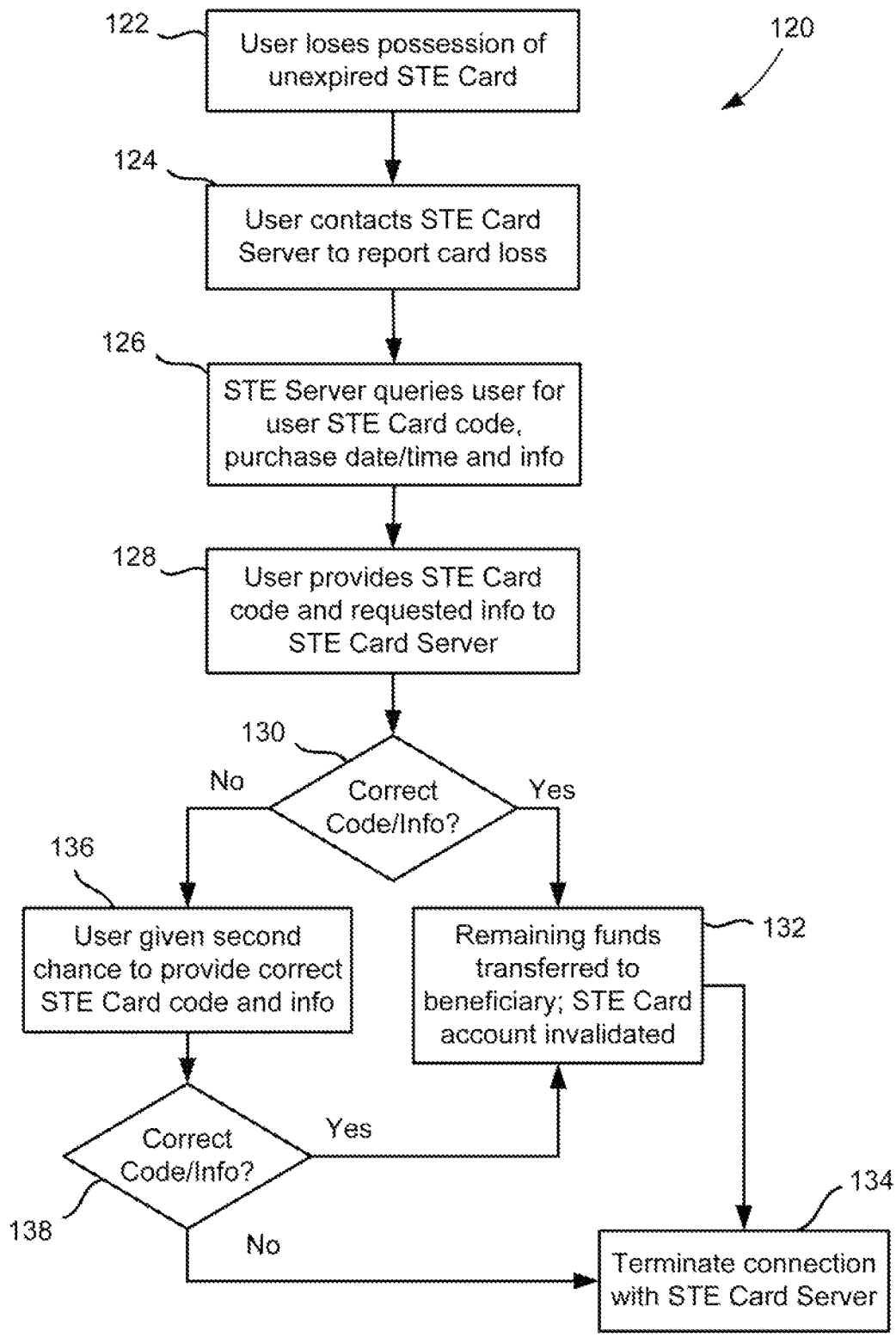
FIG. 5 is a flow diagram explaining a sequence of actions taken by a user after the secure tender electronic card has been reported as lost or stolen.

If the user loses possession of an unexpired secure tender electronic card 20, at step 122 in flow diagram 120 in FIG. 5, the user may establish contact with the STE card server 60, at step 124, to report the card loss. The STE card server 60 may query the user for information related to the purchase of the secure tender electronic card 20, at step 126. The user may be queried for: (i) the card code printout 82, (ii) the date/time of purchase 86, (iii) the expiration date/time 88, (iv) the identity of the merchant 54, and/or the identity of the beneficiary (associated with the beneficiary code 58). Presumably, this is information that the user should recall, or has recorded, and is thus information which a fraudulent user is not reasonably expected to know.

If the information or card code printout 82 provided by the user is correct, at decision block 130, the funds remaining in the card account, that is, the STE card balance 66, may be transferred to the beneficiary associated with the beneficiary code 58, at step 132, and the corresponding STE card account file 62 may then be inactivated. Connection with the STE card server 60 may be terminated, at step 134.

If the information provided by the user is not correct, at decision block 130, the user may be given a second chance to correctly provide the requested information, at step 136. If the information provided on the second try is correct, at decision block 138, the funds remaining in the card account, the STE card balance 66, may be transferred to the beneficiary associated with the beneficiary code 58, at step 132, and the corresponding STE card account file 62 is inactivated. If the information provided on the second try is not correct, at decision block 138, connection with the STE card server 60 may be terminated, at step 134.

Figure 6:
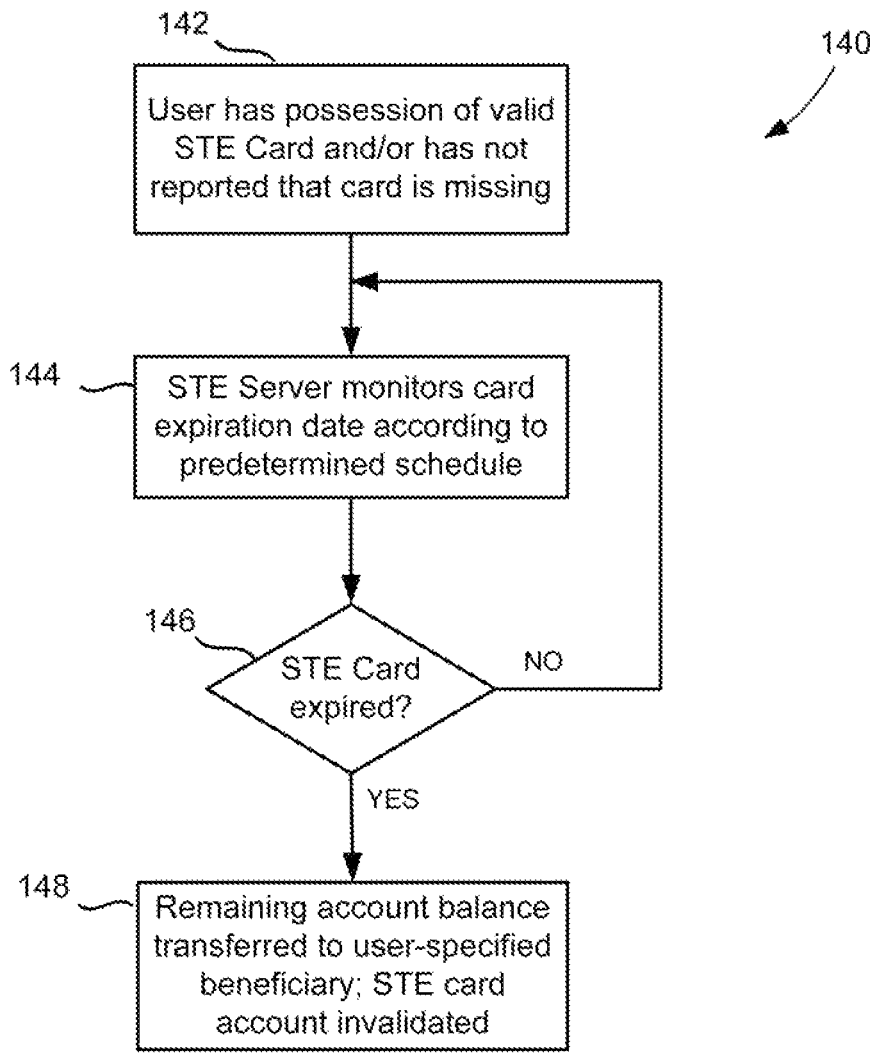
FIG. 6 is a flow diagram illustrating a task of monitoring for expiration of the secure tender electronic card of FIG. 1.

Under normal circumstances, the user continues possession of his secure tender electronic card 20, and does not report a lost or missing card, at step 142, in a flow diagram 140, in FIG. 6. The expiration status of the secure tender electronic card 20 may be monitored, at step 144, in accordance with a predetermined frequency and schedule. If the card has not expired, at decision block 146, the STE card server 60 may take no action other than continuation of the monitoring process. If the card has expired, at decision block 146, the STE card server 60 may transfer the remaining STE card balance 66 to the designated beneficiary, at step 148.

It is to be understood that the description herein is exemplary of the invention only and is intended to provide an overview for the understanding of the nature and character of the invention. The accompanying drawings are included to provide a further understanding of various features and embodiments of the method and apparatus of the invention which, together with their description serve to explain the principles and operation of the invention. Thus, while the invention has been described with reference to particular embodiments, it will be understood that the present invention is by no means limited to the particular constructions and methods herein disclosed and/or shown in the drawings.

What is claimed is:

1. A method of conducting a secure monetary transaction, said method comprising the steps of:
    accessing, by a user, a secure tender electronic card server to select a monetary amount as a card usage parameter for a secure tender electronic card, said monetary amount having a value of from zero cents to ninety nine cents;
    storing said card usage parameter in said secure tender electronic card server, said card usage parameter associated in said secure tender electronic card server with said secure tender electronic card;
    presenting, by said user, said secure tender electronic card as payment for a pending monetary transaction amount, said pending monetary transaction amount including a pending transaction dollar amount and a pending transaction cents amount;
    if said pending transaction cents amount equals said card usage parameter, validating the secure monetary transaction; and,
    if said pending transaction cents amount does not equal said card usage parameter, invalidating the secure monetary transaction.

2. The method of claim 1 wherein said secure tender electronic card comprises:
    a card code radio frequency identification (RFID) with an identification chip, said identification chip having embedded therein a secure tender electronic card identification code associated with a secure tender electronic card account file resident in said secure tender electronic card server, said secure tender electronic card account file for storing said card usage parameter; and
    a tender RFID with a tender chip having embedded therein a code associated with the monetary value of said secure tender electronic card.

3. The method of claim 2 further comprising the steps of:
    transmitting said electronic card identification code to said secure tender electronic card server; and
    retrieving, from said secure tender electronic card server, said card usage parameter from said secure tender electronic card account file.

4. The method of claim 2 wherein said tender RFID is associated with a plurality of distributed deposit accounts from which funds may be transferred for payment of said pending monetary transaction amount.

5. The method of claim 2 wherein said secure tender electronic card further comprises an expiration date, said expiration date associated with said secure tender electronic card identification code in said secure tender electronic card server.

6. The method of claim 5 wherein said expiration date is selected by said user when accessing said secure tender electronic card server.

7. The method of claim 1 wherein said card usage parameter further comprises a member of the group consisting of: a valid transaction time interval, an approved vendor, an approved commodity, and an approved service.

8. The method of claim 1 wherein said secure tender electronic card server functions to determine if said pending transaction cents amount equals said card usage parameter.

9. The method of claim 1 wherein said card usage parameter comprises a monetary amount greater than a first pre-specified monetary dollars and cents amount and less than a second pre-specified monetary dollars and cents amount.

10. The method of claim 1 wherein said card usage parameter comprises a monetary amount equal to a pre-specified monetary dollars and cents amount.

11. A method of assuring secure payment in a monetary transaction, said method comprising the steps of:
    associating by a user, in a secure tender electronic card server, a card usage parameter with a secure tender electronic card, said card usage parameter specified by said user to have a value of from zero cents to ninety nine cents;

presenting, by said user, said secure tender electronic card for payment during a pending monetary transaction at a point of sale terminal displaying a payment amount, said payment amount including a dollar payment amount and a cents payment amount;

if said point of sale terminal is notified by said secure tender electronic card server that said cents payment amount is equal to said usage parameter, completing said pending monetary transaction by transferring said payment amount to said point of sale terminal; and if said point of sale terminal is notified by said secure tender electronic card server that said cents payment amount is not equal to said usage parameter, canceling said pending monetary transaction.

12. The method of claim 11 wherein said card usage parameter comprises at least one of: (i) a pre-specified time-of-day interval during which said pending monetary transaction can be processed, and (ii) a pre-specified day of the week during which said pending monetary transaction can be completed.

13. The method of claim 11 wherein said secure tender electronic card server cancels said pending monetary transaction if said payment amount is less than a first pre-specified monetary value or greater than a second pre-specified monetary value.

14. A method of completing a secure monetary transaction, said method comprising the steps of:

purchasing, by a purchaser, a secure tender electronic card, said secure tender electronic card including an RFID with an identification chip, said identification chip having embedded therein a secure tender electronic card identification code associated with a secure tender electronic card account file, said secure tender electronic card account file resident in a secure tender electronic card server;

accessing, by said purchaser, said secure tender electronic card server to enable said purchaser to specify a value of from zero cents to ninety nine cents as a card usage parameter;

storing said card usage parameter in said secure tender electronic card account file;

presenting, by a presenter, said secure tender electronic card as payment for a pending monetary transaction amount, said pending monetary transaction amount including a dollar payment amount and a cents payment amount, said secure tender electronic card presented for at least one of a service or a commodity;

if said secure tender electronic card server determines that said cents payment amount equals said card usage parameter, validating the secure monetary transaction via said secure tender electronic card server; and, if said secure tender electronic card server determines that said cents payment amount does not equal said card usage parameter, invalidating the secure monetary transaction via said secure tender electronic card server.

15. The method of claim 14 wherein said secure tender electronic card further comprises a tender radio frequency identification, said tender radio frequency identification associated with a plurality of distributed deposit accounts from which funds may be transferred for payment of said payment amount.

* * * * *